United States Patent
Göransson et al.

(10) Patent No.: US 9,008,001 B2
(45) Date of Patent: *Apr. 14, 2015

(54) L1 CONTROL SIGNALING FOR UTRAN HSDPA

(71) Applicant: Telefonaktiebolaget L M Ericsson (Publ), Stockholm (SE)

(72) Inventors: Bo Göransson, Sollentuna (SE); Johan Bergman, Stockholm (SE); Dirk Gerstenberger, Vallentuna (SE); Janne Peisa, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,443

(22) Filed: Jun. 18, 2013

(65) Prior Publication Data

US 2014/0153483 A1    Jun. 5, 2014

Related U.S. Application Data

(63) Continuation of application No. 12/525,922, filed as application No. PCT/SE2008/050120 on Jan. 31, 2008, now Pat. No. 8,467,335.

(30) Foreign Application Priority Data

Feb. 5, 2007  (SE) ...................................... 0700287
Mar. 27, 2007  (SE) ...................................... 0700838

(51) Int. Cl.
  *H04W 4/00*  (2009.01)
  *H04B 7/216*  (2006.01)
  (Continued)

(52) U.S. Cl.
  CPC ............. *H04W 24/02* (2013.01); *H04L 1/0035* (2013.01); *H04L 69/323* (2013.01); *H04L 69/324* (2013.01); *H04L 1/0079* (2013.01); *H04L 1/1819* (2013.01); *H04W 28/04* (2013.01)

(58) Field of Classification Search
  None
  See application file for complete search history.

(56) References Cited

U.S. PATENT DOCUMENTS 7,684,372 B2   3/2010  Beale et al.
2003/0147371 A1   8/2003  Choi et al.
(Continued)

FOREIGN PATENT DOCUMENTS

EP      1641298 A1    3/2006
WO    WO 2008053323 A2    5/2008

OTHER PUBLICATIONS

3GPP TSG-RAN2 Meeting #56bis, R2-070408 Jan. 15-19, 2007 Draft LS on HS SCCH enhancements in CELL FACH www.3gpp.org.

(Continued)

*Primary Examiner* — Jae Y Lee
*Assistant Examiner* — Diane Lo

(57) ABSTRACT

A Level-1 (L1) signaling flag is mapped to unused (invalid) bit sequences in Part 1 of the HS-SCCH—that is, Part 1 bit encodings that are not defined in the UTRAN specifications—and a corresponding L1 command is encoded in Part 2. This allows UE (18) to detect early that the HS-SCCH is pure L1 signaling, and the UE (18) may avoid wasting power by not processing an accompanying HS-PDSCH. Alternatively, in CPC HS-SCCH-less mode, the UE (18) may blind decode the HS PDSCH. In one embodiment, a general DRX mode is defined and controlled via L1 signaling. In one embodiment, a UE (18) acknowledgement improves the L1 signaling accuracy. In one embodiment, a L1 signal and UE (18) acknowledgement protocol are utilized to "ping" a UE (18).

24 Claims, 3 Drawing Sheets

(51) Int. Cl.
*H04W 24/02* (2009.01)
*H04L 1/00* (2006.01)
*H04L 29/08* (2006.01)
*H04L 1/18* (2006.01)
*H04W 28/04* (2009.01)

(56) References Cited

U.S. PATENT DOCUMENTS

2006/0148507 A1 7/2006 Liljestrom et al.
2007/0133479 A1 6/2007 Montojo et al.
2008/0102880 A1 5/2008 Gholmieh et al.
2008/0130488 A1 6/2008 Kuo
2008/0165697 A1 7/2008 Zeira et al.

OTHER PUBLICATIONS

3GPP TSG-RAN-WG2 Meeting #56bis R2-070151 Jan. 15-19, 2007 HSDPA Transmission Control in CELL FACH state in FDD www.3gpp.org.

3GPP TSG-RAN-WG1 Meeting #48 R1-071112 Feb. 12-16, 2007 HS-SCCH part 1 for MIMO. HOM and CPC www.3gpp.org.

L1 CONTROL SIGNALING FOR UTRAN HSDPA

CLAIMING BENEFIT OF PRIOR FILED U.S. APPLICATION

This application is a continuation of International Application PCT/SE2008/050120, which has an international filing date of Jan. 31, 2008 and corresponds to the national-stage entry U.S. patent application Ser. No. 12/525922, filed Aug. 5, 2009, and which claims priority under 35 USC. §119 to Swedish Application No. SE 0700287-6, filed Feb. 5, 2007 and Swedish application SE 0700838-6 filed Mar. 27, 2007. The contents of all of the preceding are hereby incorporated by reference herein.

TECHNICAL FIELD

The present invention relates generally to wireless communications and in particular to improved L1 signaling between a UTRAN network and User Equipment.

BACKGROUND

The present invention relates to low level signaling in a UMTS Terrestrial Radio Access Network (UTRAN). A UTRAN wireless communication network 10 is depicted in FIG. 1. The UTRAN network comprises a Core Network (CN) 12, a plurality of Radio Network Controllers (RNC) 14, and plurality of Node Bs 16, also known in the art as Base Stations, each providing communication services to one or more User Equipment (UE) 18, also known as mobile stations, across an air interface within a cell or sector 20. The CN 12 may be communicatively coupled to other networks such as the Public Switched Telephone Network (PSTN), the Internet, a GSM network, or the like, and the UTRAN network 10 provides data transfer between these external networks and UE 18.

High-Speed Downlink Packet Access (HSDPA) introduced numerous features into the UTRAN network 10, including broadcasting data packets throughout the cell 20 on a High Speed Downlink Shared Channel (HS-DSCH) and control information on a high Speed Shared Control Channel (HS-SCCH). HSDPA utilizes channel-dependent scheduling, whereby data directed to each UE 18 is scheduled for transmission on the shared channel when the instantaneous channel quality to that UE 18 is high. To support this feature, which requires rapid response to changing channel conditions, scheduling is moved from the RNC 14 into the Node B 16, and a shorter Transmission Time Interval (TTI) of 2 msec (or 3 slots) is defined.

Similarly, fast rate control and higher order modulation (HOM)—referred to together as Adaptive Modulation and Coding (AMC)—are used for link adaptation, wherein the data rate of each transport block and the modulation scheme are varied in response to channel conditions to the target UE 18 (and the capability of the UE 18). In addition, HSDPA employs a hybrid-ARQ (HARQ) acknowledgement scheme, wherein soft values of unsuccessfully decoded transport blocks are retained and combined with the soft decoding results of each retransmission. This allows for incremental redundancy, reducing the need for further retransmissions. The scheduling, AMC, and HARQ functions must all be close to the radio interface on the network side, and hence have been migrated to the Node B 16.

Multiple-Input, Multiple-Output (MIMO) technology is another HSDPA feature being incorporated in to the UTRAN standards. In particular, MIMO may be combined with HOM in a forthcoming UTRAN standard revision. Such features have traditionally been controlled by the RNC 14, via Layer 3 (L3) signaling. A fundamental deficiency of RNC 14 control of HSDPA features is high latency, relative to the TTI length. If certain features or modes should optimally be switched on/off frequently, the overhead in higher layer signaling becomes a major obstacle. Indeed, if mode switching is required frequently enough, higher layer signaling is not an option.

Another example of a HSDPA feature that suffers from excessive latency under RNC 14 control is Discontinuous Transmission (DTX) and/or Discontinuous Reception (DRX) modes in UE 18. Release 7 of the UTRAN specification defines "continuous connectivity for packet data users," or simply, Continuous Packet Connectivity (CPC). CPC enhances system capacity to support a very large number of packet-oriented users by reducing signaling overhead, uplink interference, and downlink transmission power. One feature of CPC mode is uplink DTX, to reduce uplink interference and conserve UE battery power (due to power control, uplink DTX implies downlink DRX). Furthermore, a DRX mode independent of CPC would be beneficial, to relieve UE 18 from the requirement of monitoring every HS-SCCH transmission for L1 signaling. A CPC-independent DRX/DTX mode would ideally include a provision for acknowledgement by the UE 18. For example, the network 10 should not schedule downlink data to a UE 18 in DRX, that has been sent a command to terminate the DRX mode, until it receives an acknowledgement from the UE 18 that DRX mode is actually terminated, and the UE 18 is monitoring HS-SCCH.

In CPC mode, UE 18 DRX/DTX is controlled by certain bit sequences in a Transport Block Size (TBS) field of an HS-SCCH transmission (that is, bit sequences that are not valid TBS values). However, the DRX/DTX bits are in Part 2 of the HS-SCCH, which requires a UE 18 to detect the entire HS-SCCH to deduce if the TBS field is valid (and accompanying data will be found in a HS-PDSCH transmission) or if a CPC command is encoded into the TBS field (in which case no data is transmitted, and the HS-SCCH is pure L1 signaling). Since the IBS field is in Part 2 , the UE 18 must process a HS-PDSCH in either case—which is wasted power in the latter case.

Another problem with this particular means of L1 signaling of DRX/DTX mode occurs with respect to another CPC feature: HS-SCCH-less operation, in which data are transmitted without the accompanying control information to reduce downlink interference, UE 18 first look for HS-SCCH-accompanied HS-PDSCH transmissions. If none is detected, the UE 18 should attempt to receive HS-SCCH-less HS-PDSCH transmissions, using blind decoding to discover the coding rate. Part 1 of a HS-SCCH transmission including only DRX/DTX L1 control signaling is indistinguishable from Part 1 of a HS-SCCH transmission accompanying a HS-PDSCH transmission (the TBS field being in Part 2 ). Accordingly, upon detecting HS-SCCH, UE 18 have no choice but to assume there will be a HS-SCCH-accompanied HS-PDSCH transmission. This precludes the UE 18 from processing the HS-PDSCH transmission as a HS-SCCH-less one, thus preventing the network 10 from simultaneously transmitting DRX/DTX L1 control signaling on HS-SCCH and data in a HS-SCCH-less HS-PDSCH. Using the defined TBS bit sequences for transmitting a CPC-independent DRX/DTX (de)activation signal suffers the same problems.

SUMMARY

According to various embodiments described and claimed herein, an L1 signaling flag is mapped to unused (invalid) bit sequences in Part 1 of the HS-SCCH—that is, Part 1 bit encodings that are not defined in the UTRAN specifications—and a corresponding L1 signaling command is encoded in Part 2. This allows UE 18 to detect early that the HS-SCCH is pure L1 signaling, and the UE 18 may avoid wasting power by not processing an accompanying HS-PDSCH. Alternatively, in CPC HS-SCCH-less mode, the UE 18 may blind decode the HS-PDSCH. In one embodiment, the L1 signaling flag indicates that CPC DRX mode commands are encoded in Part 2. In another embodiment, a general (i.e., non-CPC) DRX mode is defined, and controlled via L1 signaling. In one embodiment, a UE 18 acknowledgement improves the L1 signaling accuracy. In one embodiment, a L1 signal and UE 18 acknowledgement protocol are utilized to "ping" a UE 18.

Encoding an L1 signaling flag into unused Part 1 bit encodings in the HS-SCCH provides UE 18 with advanced notice that the HS-SCCH is for L1 signaling and does not accompany HS-PDSCH Data. It also enables the network 10 to simultaneously transmit L1 signaling commands and HS-SCCH-less data packets. Transmitting the L1 signals by a scheduler in the Node B 16 improves response time and reduces latency over comparable L3 signaling. A non-CPC DRX mode provides for UE 18 power savings, and L1 DRX signaling with UE 18 acknowledgements may implement a ping operation.

DETAILED DESCRIPTION

Figure 1:
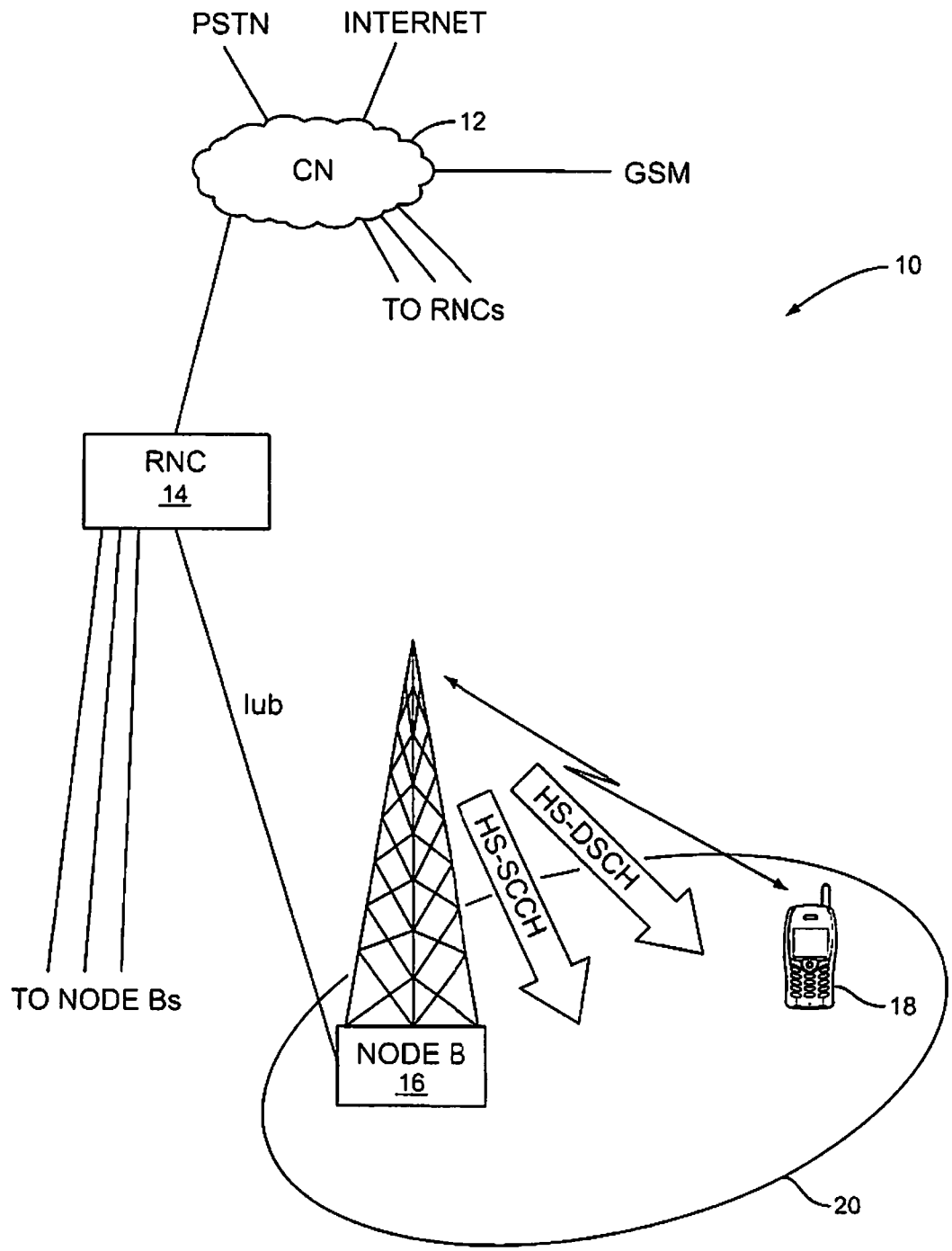
FIG. 1 is a functional block diagram of a UTRAN wireless communication network.
Figure 2:
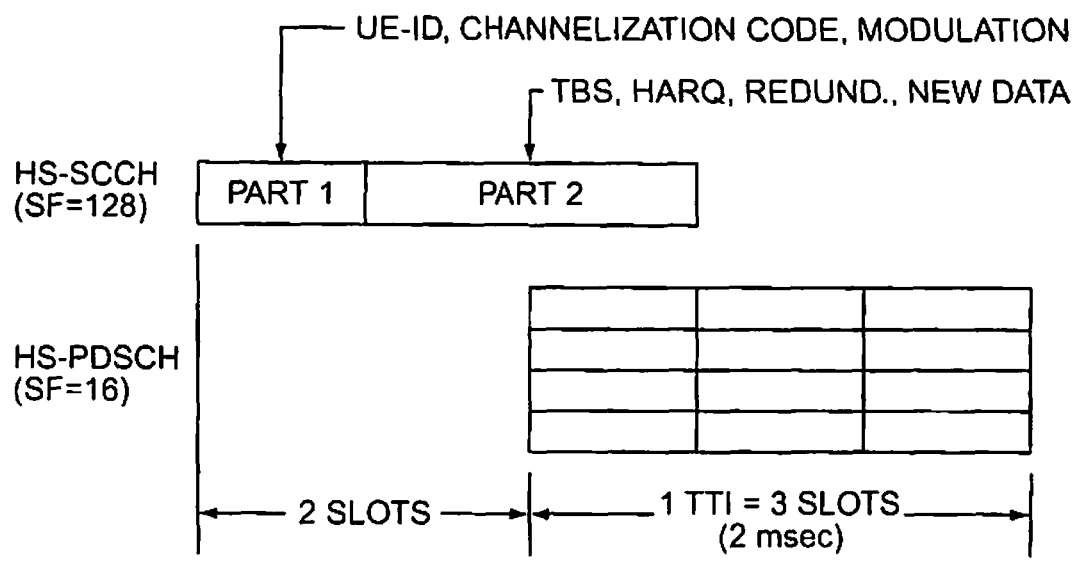
FIG. 2 is depicts HS-SCCH and HS-PDSCH frame structure and timing.

FIG. 2 depicts the frame structure and relative timing of the HS-SCCH and HS-PDSCH. The HS-SCCH is a fixed rate (60 kbps, Spreading Factor=128) downlink physical channel used to carry downlink signaling related to HS-DSCH transmission. This provides timing and coding information thus allowing the UE 18 to listen to the HS-PDSCH at the correct time and using the correct codes to successfully decode UE 18 data. The HS-SCCH is transmitted two slots in advance of the corresponding HS-DSCH TTI. The HS-SCCH is divided into two parts, and includes the following control information (when MIMO is not configured):

Part 1:
UE identity (16 bits): Xue
Channelization-code-set (7 bits): Xccs
Modulation scheme information (1 bit): Xms
Part 2:
Transport-block size information (6 bits): Xtbs
Hybrid-ARQ process information (3 bits): X hap
Redundancy and constellation version (3 bits): X rv
New data indicator (1 bit): X nd The HS-PDSCH is a variable rate (SF=16) physical downlink shared channel used to carry data packets directed to one or more specific UE 18. The HS-PDSCH has a fixed Spreading Factor of 16, a static TTI length of 3 slots (2 msec), a fixed CRC of 24 bits, and error correction using ⅓ turbo coding. Data may be modulated by QPSK or 16 QAM, as specified in the associated HS-SCCH.

As discussed above, it is known to utilize unused (invalid) encodings of the TBS field of HS-SCCH Part 2 to carry L1 signaling—specifically, DRX/DTX commands in CPC mode. However, this field is in Part 2, leaving insufficient time for the UE to decode the TBS field prior to receiving and processing—or not—the HS-PDSCH.

Some bit sequences in Part 1 of the HS-SCCH are not defined in the UTRAN specifications. According to one or more embodiments, an L1 signaling flag is mapped to these unused (invalid) Part 1 bit sequences, and L1 signaling is encoded in Part 2. By encoding the L1 signaling flag into Part 1, a UE 18, upon first receiving a HS-SCCH transmission, can immediately ascertain whether the HS-SCCH transmission is dedicated to L1 signaling. This presents several significant advantages over the prior art.

In particular, if for the current CPC DRX/DTX L1 signaling, an L1 flag is encoded in Part 1, UE 18 decoding a HS-SCCH Part 1 are assured that if Part 1 decodes to their Xue, and valid Xccs and Xms values, an accompanying HS-PDSCH transmission contains data and the UE 18 must process it. Alternatively, if the UE 18 detects the L1 signaling flag in Part 1, it may safely ignore a succeeding HS-PDSCH transmission or, if HS-SCCH-less mode is enabled, it may blind decode the HS-PDSCH transmission in parallel with interpreting and responding to the L1 signaling in Part 2. This allows the UTRAN network 10 to simultaneously send L1 signaling and HS-SCCH-less data packets to a UE 18—functionality that is not possible in prior art network implementations.

The L1 DRX/DTX (de)activation signal(s) need not be confined to CPC mode DRX/DTX. Release 7 of the UTRAN specification defines an Enhanced CELL_FACH state. In CELL_FACH state, no dedicated physical channel is allocated to the UE in Frequency Domain Duplex (FDD) systems (in Time Division Duplex (TDD) mode, one or several USCH or DSCH transport channels may have been established). The UE 18 continuously monitors a Forward Access Channel (FACH) in the downlink, and is assigned a default common or shared transport channel in the uplink (e.g., RACH) on which it may initiate access to the network 10.

It would be advantageous to UE 18 power consumption if the UE 18 was not required to continuously monitor HS-SCCH. According to one embodiment, a general DRX mode is defined that controls UE 18 reception behavior. For example, a DRX activation period may be defined during which the UE 18 may switch off its receiver circuits to conserve battery power. At the expiration of a predefined DRX activation cycle, the UE 18 activates its receiver to monitor HS-SCCH transmissions for a short period to determine if data is scheduled for that UE 18. Either or both of the DRX activation period and the DRX deactivation period durations may be specified in the L1 signaling (for example, encoded into HS-SCCH Part 2), or may be configured in advance by higher layer applications.

Some data transmissions will be delayed when DRX mode is enabled, as the network 10 must wait for the next occasion of UE 18 DRX deactivation prior to scheduling data for transmission. The mean delay will depend primarily on the length of the DRX activation period. Those of skill in the art, given the teachings of the present application, will be able to determine the appropriate trade-off between UE 18 battery savings and acceptable delay in data transmissions, for a given implementation.

While the RNC 14 may control the general DRX mode for UE 18 via L3 signaling, the L3 signaling adds significant overhead and latency, particularly where the network 10 requires an acknowledgement from the UE 18 of its DRX state prior to transmitting data to it. Furthermore, for the same reason scheduling, AMC, and HARQ were moved to the Node B 16—that it has more detailed knowledge of the instantaneous channel conditions, available power, available codes, and other parameters—transmission of L1 —DRX signaling in Part 1 of HS-SCCH is preferably performed by the Node B 16, in particular, by the scheduler in the Node B 16.

Regardless of the signaling mechanism used for moving the UP 18 between different DRX modes, it should be noted that a signaling failure could have serious negative impacts on user experience and system performance. If the UE 18 erroneously activates DRX mode, data loss may occur when the Node B 16 schedules data to the UE 18 while the UE 18 is not monitoring HS-SCCH. Alternatively, if the UE 18 erroneously deactivates DRX, its battery consumption will be unnecessarily high. Signaling failures should thus be minimized. One known method to reduce signaling failure is via a reliable acknowledgement mechanism.

In one embodiment, the UF 18 acknowledges a general (i.e., non-CPC) DRX mode command by transmitting an acknowledgment on the Random Access Channel (RACH), which is the uplink channel available in CELL_FACH state. The acknowledgment must identify the UE 18—a requirement of any RACH transmission—and additionally includes a unique code indicating that the transmission acknowledges receipt of the corresponding DRX command, in one embodiment, the acknowledgment is captured directly by the Node B 16. In another embodiment, the acknowledgment is received by the RNC 14, which then informs the Node B 16 of it. The latter embodiment may be viewed as an L1 signal encapsulated in an L3 message. While there is no difference between these two embodiments in principle, as a practical matter, direct capture by the Node B 16 will result in the lowest latency and fastest response.

Figure 3:
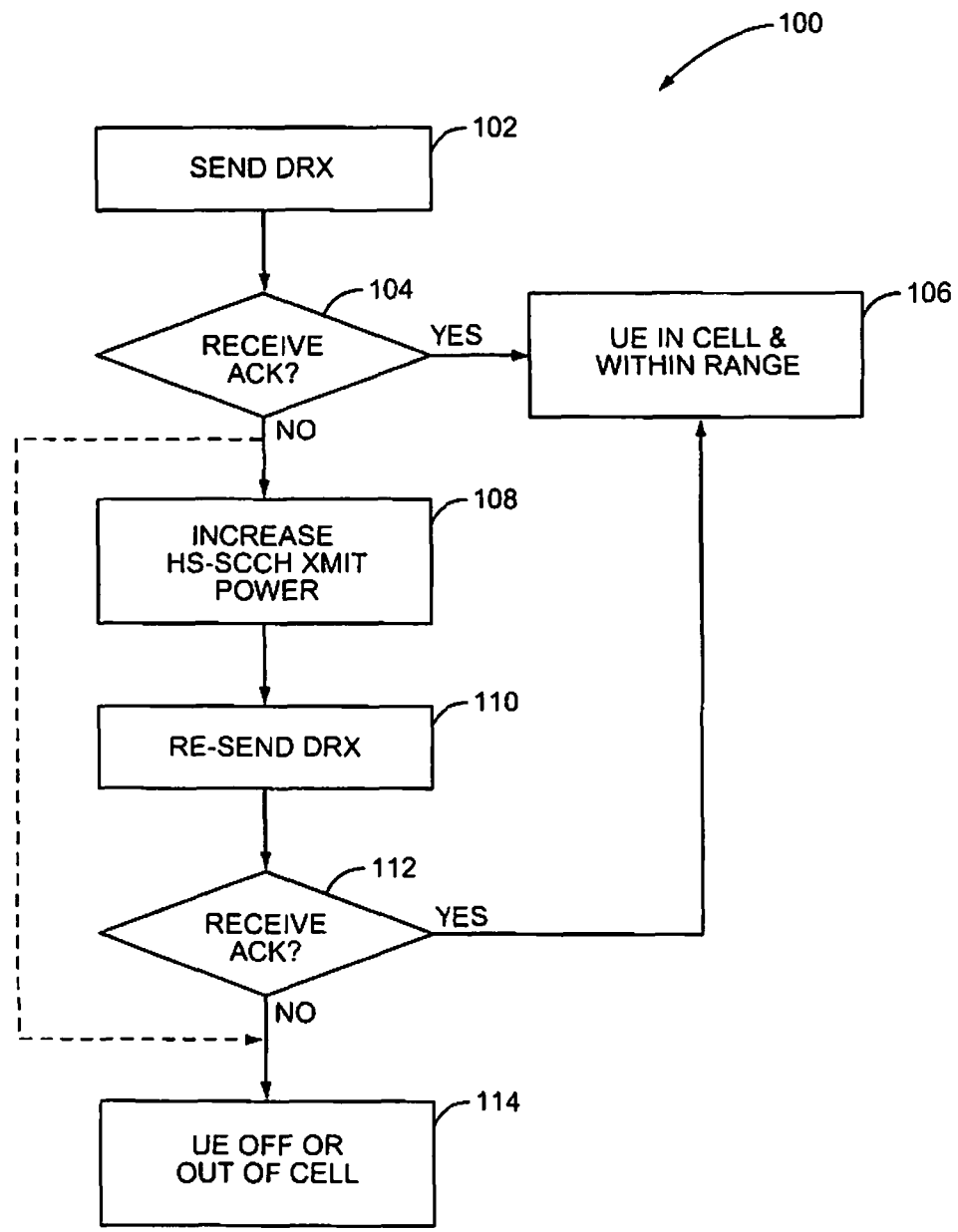
FIG. 3 is a flow diagram of a method of pinging a UE in a UTRAN network.

An additional advantage of a general DRX mode via L1 signaling and DRX acknowledgement by UE 18 is that the Node B 16 may make use of the signaling protocol to implement a "ping" operation to verify the operative presence of a UE 18. This method 100 is depicted in flow diagram form in FIG. 3. At any time, if a UE 18 is in DRX disabled mode (i.e., constantly monitoring HS-SCCH), or during a deactivation period, if the UE 18 is in DRX enabled mode (i.e., only periodically monitoring HS-SCCH), the Node B 16 may send the UE 18 a DRX L1 signal commanding the UE 18 to (preferably) the same DRX mode (block 102). If the Node B receives an acknowledgment (block 104), it knows the UE 18 is in the cell 20, and within the range of the HS-SCCH transmission power level (block 106). If the Node B 16 does not receive an acknowledgement of the LI signal (block 104), it may increase the HS-SCCH transmission power level (block 108) and resend the DRX command (block 110). If the Node B 16 again does not receive an acknowledgement the L1 signal (block 112), it may assume the UE 18 has been turned off or has left the cell 20 (block 114). Of course, the increased-power attempt to ping the UE 18 is optional, as indicated by the dashed-line path from block 104 to block 114 in FIG. 3. Note that the Node B 16 should take care that, if the signaling is for pinging a UE 18 and not a DRX mode change, it should ideally only command the UE 18 to its then-current DRX mode.

While an L1 signaling flag in Part 1 of HS-SCCH has been described herein with respect to general DRX mode commands, the present invention is not so limited. In general, any command may be encoded into Part 2 of HS-SCCH, and indicated by an L1 signaling flag in Part 1, such as commands controlling CPC, HOM, MIMO, or any other UE 18 mode or feature. By placing an L1 signaling flag in Part 1, the UE 18 may quickly distinguish a pure L1 signaling HS-SCCH from an HS-SCCH accompanying a HS-PDSCH. This allows the UE 18 to safely ignore the HS-PDSCH, or alternatively to blind decode an HS-SCCH-less HS-PDSCH.

The present invention may, of course, be carried out in other ways than those specifically set forth herein without departing from essential characteristics of the invention. The present embodiments are to he considered in all respects as illustrative and not restrictive, and all changes coming within the meaning and equivalency range of the appended claims are intended to be embraced therein.

What is claimed is:

1. A method, performed by a user equipment (UE), of controlling Discontinuous Reception (DRX), comprising:
   receiving an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   transmitting an acknowledgement of the L1 DRX command.

2. The method of claim 1, wherein the L1 signal acknowledgement is transmitted on a Random Access Channel (RACH).

3. The method of claim 1, wherein the L1 DRX command is independent of a Continuous Packet Connectivity (CPC) mode.

4. The method of claim 3, further comprising receiving the L1 DRX command to enter a current DRX mode of the UE and transmitting an acknowledgement.

5. A non-transitory computer-readable medium storing instructions thereon for performing a method of controlling Discontinuous Reception (DRX), the method comprising:
   receiving an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   transmitting an acknowledgement of the L1 DRX command.

6. The non-transitory computer-readable medium of claim 5, wherein the L1 signal acknowledgement is transmitted on a Random Access Channel (RACH).

7. The non-transitory computer-readable medium of claim 5, wherein the L1 DRX command is independent of a Continuous Packet Connectivity (CPC) mode.

8. The non-transitory computer-readable medium of claim 7, the method further comprising receiving the L1 DRX command to enter a current DRX mode of the UE and transmitting an acknowledgement.

9. A user equipment (UE), operative to:
   a receiver configured to receive an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   a transmitter configured to transmit an acknowledgement of the L1 DRX command.

10. The UE of claim 9, wherein the L1 signal acknowledgement is transmitted on a Random Access Channel (RACH).

11. The UE of claim 9, wherein the L1 DRX command is independent of a Continuous Packet Connectivity (CPC) mode.

12. The UE of claim 11, wherein the UE is further operative to receive the L1 DRX command to enter a current DRX mode of the UE and transmit an acknowledgement.

13. A method, performed by a Node B, of controlling Discontinuous Reception (DRX), comprising:
   transmitting to a user equipment (UE) an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   receiving from the UE an acknowledgement of the L1 DRX command.

14. The method of claim 13, wherein the L1 signal acknowledgement is received on a Random Access Channel (RACH).

15. The method of claim 13, wherein the L1 DRX command is independent of a Continuous Packet Connectivity (CPC) mode.

16. The method of claim 15, further comprising pinging a UE by transmitting the L1 DRX command to enter a current DRX mode of the UE and receiving a UE acknowledgement.

17. A non-transitory computer-readable medium storing instructions thereon for performing a method of controlling Discontinuous Reception (DRX), the method comprising:
   transmitting to a user equipment (UE) an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   receiving from the UE an acknowledgement of the L1 DRX command.

18. The non-transitory computer-readable medium of claim 17, wherein the L1 signal acknowledgement is received on a Random Access Channel (RACH).

19. The non-transitory computer-readable medium of claim 17, wherein the L1 DRX command is independent of a Continuous Packet Connectivity (CPC) mode.

20. The non-transitory computer-readable medium of claim 19, the method further comprising pinging a UE by transmitting the L1 DRX command to enter a current DRX mode of the UE and receiving a UE acknowledgement.

21. A Node B operative to:
   a transmitter configured to transmit an L1 signaling flag encoded into an unused bit encoding in Part 1 of a High Speed Shared Control Channel (HS-SCCH) transmission, wherein the L1 signaling flag indicates that Part 2 of the HS-SCCH includes an encoded L1 Discontinuous Reception (DRX) command to be decoded by the UE; and
   a receiver configured to receive from the UE an acknowledgement of the L1 DRX command.

22. The Node B of claim 21, wherein the L1 signal acknowledgement is received on a Random Access Channel (RACH).

23. The Node B of claim 21, wherein the L1 DRX command is independent of a Continuous Packet Connectivity (CPC) mode.

24. The Node B of dam 23, wherein the Node B is further operative to receive ping a UE by transmitting the L1 DRX command to enter a current DRX mode of the UE and receive a UE acknowledgement.

\* \* \* \* \*

UNITED STATES PATENT AND TRADEMARK OFFICE
CERTIFICATE OF CORRECTION

PATENT NO.        : 9,008,001 B2
APPLICATION NO.   : 13/920443
DATED             : April 14, 2015
INVENTOR(S)       : Göransson et al.

Page 1 of 1

It is certified that error appears in the above-identified patent and that said Letters Patent is hereby corrected as shown below:

In the Specification

In Column 1, Line 43, delete "high" and insert -- High --, therefor.

In Column 2, Line 39, delete "IBS" and insert -- TBS --, therefor.

In Column 2, Line 46, delete "interference," and insert -- interference. --, therefor.

In Column 3, Line 32, delete "FIG. 2 is" and insert -- FIG. 2 --, therefor.

In Column 5, Line 3, delete "L1-DRX" and insert -- L1 DRX --, therefor.

In Column 5, Line 8, delete "UP 18" and insert -- UE 18 --, therefor.

In Column 5, Line 18, delete "UF 18" and insert -- UE 18 --, therefor.

In Column 5, Line 44, delete "Node B" and insert -- Node B 16 --, therefor.

In Column 6, Line 7, delete "to he" and insert -- to be --, therefor.

In the Claims

In Column 8, Line 29, in Claim 24, delete "dam" and insert -- claim --, therefor.

Signed and Sealed this
Eleventh Day of August, 2015

Michelle K. Lee
*Director of the United States Patent and Trademark Office*